United States Patent
Gao et al.

(10) Patent No.: US 7,152,203 B2
(45) Date of Patent: Dec. 19, 2006

(54) INDEPENDENT UPDATE AND ASSEMBLY OF WEB PAGE ELEMENTS

(75) Inventors: Yang Gao, Fremont, CA (US); Zheng John Shi, San Francisco, CA (US); Shun Gao, San Jose, CA (US); Armeen Mazda, Tiburon, CA (US)

(73) Assignee: Appeon Corporation, Hong Kong (HK)

( * ) Notice: Subject to any disclaimer, the term of this patent is extended or adjusted under 35 U.S.C. 154(b) by 885 days.

(21) Appl. No.: 09/916,248

(22) Filed: Jul. 30, 2001

(65) Prior Publication Data

US 2002/0032701 A1   Mar. 14, 2002

Related U.S. Application Data

(60) Provisional application No. 60/231,842, filed on Sep. 11, 2000.

(51) Int. Cl.
*G06N 3/00* (2006.01)
(52) U.S. Cl. ...................................................... 715/513
(58) Field of Classification Search ................ 715/513, 715/526, 501, 517, 523, 530; 345/744, 473
See application file for complete search history.

(56) References Cited

U.S. PATENT DOCUMENTS

| | | | | |
|---|---|---|---|---|
| 5,945,989 A * | 8/1999 | Freishtat et al. ............ 345/760 |
| 6,012,071 A * | 1/2000 | Krishna et al. ............. 715/522 |
| 6,249,291 B1 * | 6/2001 | Popp et al. ................. 345/473 |
| 6,457,030 B1 * | 9/2002 | Adams et al. ............... 715/523 |
| 6,560,639 B1 * | 5/2003 | Dan et al. ................... 709/218 |
| 6,771,291 B1 * | 8/2004 | DiStefano, III ............. 345/762 |
| 2002/0124100 A1 * | 9/2002 | Adams ........................ 709/232 |

* cited by examiner

*Primary Examiner*—Stephen Hong
*Assistant Examiner*—Kyle Stork
(74) *Attorney, Agent, or Firm*—Patterson, Thuente, Skaar & Christensen, P.A.

(57) ABSTRACT

The invention permits assembly of Web pages for display, to include text elements received from discrete network locations, and permits independent update of individual text elements of a Web page without reassembling the entire Web page, and permits independent update of all types of page elements without a client side agent other than a browser. In one aspect of the invention, a browser at a client device updates the display of a Web page containing at least one first element by transmitting a request to a server for a second element that is related to the first element, receiving the second element, and then displaying the second element with the Web page, without reassembling the Web page. In another aspect of the invention, the transmitting, receiving, and displaying are accomplished without a client side agent other than the browser.

45 Claims, 4 Drawing Sheets

INDEPENDENT UPDATE AND ASSEMBLY OF WEB PAGE ELEMENTS

CROSS-REFERENCE TO RELATED APPLICATIONS

This application claims the benefit of U.S. Provisional Application No. 60/231,842 filed Sep. 11, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to display of Web pages and, more particularly, to assembly and update of Web page elements.

2. Description of the Related Art

The Internet is a computer network that provides access to the World Wide Web ("the Web"), a vast collection of pages comprised of text, graphical, and multimedia elements. Graphical user interface programs called Web browsers are employed by Internet users to receive, or download, the Web pages from servers and display the pages at their client computers. A Web browser displays Web pages by showing the text and graphical elements on a client display screen and by playing sound files and showing video sequences.

The rapid increase in the number of Internet users and in the amount of information being downloaded by users has resulted in high volumes of traffic, as well as increasing delays in downloading Web pages. Delays in downloading pages make an Internet user's browsing experience less enjoyable. This is especially true for Internet users who do not have high-speed access to the Internet. The response time for the transfer of page elements between servers and clients could be improved if the amount of data traffic passing over the Internet could be reduced.

To download a Web page, a user at a client machine requests a Web page by sending a Web page address to the corresponding Web server. A Web page address is specified by a uniform resource locator (URL). When the Web server receives the URL request from a client machine, it determines the format and elements of the requested Web page and constructs a text file according to the hypertext mark-up language (HTML) standard. The HTML file specifies the text to be written and the Web page elements, such as URLs for image files that are to be viewed or displayed, and the format in which they should be presented. The server sends the HTML text file to the client machine, along with any corresponding data files specified by the HTML code.

At the client machine, the user's Internet browser receives the HTML code and automatically renders the page elements, displaying the text data and sending further requests for files specified by URLs in the HTML code. The requests for files may include, for example, image files at servers other than the server from which the original HTML code was received. Thus, it should be apparent that displaying a single Web page may involve many different requests for data and numerous transfers of data between the client machine and one or more Web servers.

One contributor to the excessive Internet traffic that is slowing down the Web is the requirement for reloading of Web pages. Typically, each time a user "visits" a Web page by requesting its contents, that user's Web browser must reload the page data by requesting the entire HTML code and the corresponding data elements. Although some Web pages have a large number of elements that change frequently, it is more typical for a page to be largely static. That is, most of the page elements will not change. The download of Web pages could proceed much more smoothly if all of the elements of a Web page did not need to be transferred from a server every time the page is requested.

Some Web page source files can be specified in the HTML code, such as graphical images and sound files, so they can be referenced by name and independently requested from corresponding servers. The graphical image files are typically among the largest elements of a Web page and take the most time to download. Thus, browsers may cache such files at the user's computer. When a user requests a Web page, the user's browser can check for updated graphical image files. If there has been no change between the version stored in the user's cache and the version to be obtained from the Web server, then the browser will not request the server version, and instead will use the cached version. This reduces the number of page elements that must be requested from the Internet, giving the user the appearance of a faster connection, and thereby providing a more pleasurable experience.

Other developments illustrate the great effort at reducing the amount of data that must be transferred between user (client) computers and the Web servers from which page elements are retrieved. For example, companies have begun to provide a Web cache service whereby they provide intermediate storage of data files at a network location between the Web server and the user computer. The intermediate storage is typically distributed about in multiple network locations to provide faster response to user requests for graphical images. Web cache services work in concert with Web page servers, as follows. When users request a page from a Web server, the Web server assembles the page elements into the HTML file that will be sent to the user browser. The Web server determines which Web server or cache location can most quickly provide a graphical element of the requested page. The Web server places the corresponding URL in the HTML code that is sent to the user's computer. When the user's browser receives the HTML code, it displays the HTML text and requests the graphical elements from the servers indicated by the Web server. In this way, users should receive page elements more quickly than if all the elements came from the original Web server.

While such Web cache techniques can deliver graphical images more quickly to users, the cache files are limited to "tagged" files, such as graphical images (JPEG, GIF, and other image files) and sound files (such as WAV files). The HTML files, and therefore the portions of the Web page that comprise text, must still be obtained from the original server. Moreover, with every page request, all of the page elements will be requested, even if there have been no changes in the individual elements.

There presently is no way to independently request download of individual elements from a Web page, other than tagged elements. Thus, every time a page reload or refresh operation is initiated by the user, the entire contents of the Web page will be requested from a server, the lone exception being any tagged element files that are cached at the user's computer. It would reduce the amount of data to be transferred between client and server if refresh requests could be processed by delivering only the updated portions of a Web page, and if such independent updates could include elements that are not tagged files, such as Web page text portions.

Another development that reduces data transfer for display of Web pages is the use of applets written in the "Java" programming language, as developed by Sun Microsystems, Inc. of Mountain View, Calif., USA. Such applets are files of executable code that are received at user client machines from Web servers and then executed at the client. Thus, the Java applets comprise computer programs that must be received from a server and then must be executed from within a suitably equipped (Java-enabled) browser.

A browser typically "pauses" in its page display operations while a Java applet is being downloaded. Once they are executing, Java applets give the user the illusion of dynamic (and continuous) downloading activities. That is, to generate an equivalent Web page display without the Java applet, the user would have to continuously download data from a Web server. The Java applet may provide dynamic display of information in the user's Web browser, but cannot access additional resources on the user computer, and must be fully downloaded before they can execute their operations. Moreover, the information displayed by a Java applet cannot be updated independently of the applet itself. Thus, to update the Java display, the user must download another version of the Java applet. In addition, each time the display is changed, a new applet must be written and provided at the Web server.

From the discussion above, it should be apparent that there is a need for a quick, efficient means of assembling Web pages for display, to include text elements received from discrete network locations, and there is a need for independent update of individual elements of a Web page without reassembling the entire Web page. The present invention fulfills this need.

BRIEF SUMMARY OF THE INVENTION

The invention permits independent update of individual display elements of a Web page without reassembling the entire Web page, and permits independent update of all types of page elements without a client side agent other than a browser. Page elements that do not include a named source, such as text elements, may nevertheless be received from discrete network locations, and therefore they may be independently assembled and updated. In accordance with the invention, a browser displays a Web page containing at least one first element of the Web page and transmits to a server a request for a second element of the Web page, receives the second Web page element, and then displays the second element with the Web page, without reassembling the entire Web page. Thus, a page reload action does not require the browser to request all of the named source elements, as well as all the page elements that do not include a named source. Rather, only the page elements that require updating need be requested by the browser. In this way, the invention provides a quick, efficient means of assembling all elements of a Web page for display, including text elements received from discrete network locations, and supports independent update of individual elements of a Web page without reassembling the entire Web page.

The browser sends the request for the second element of the Web page, so that the browser determines when a request for an update of a page element should be sent. Thus, the browser is not limited to requesting only named source elements, or requesting the entire page. In one aspect of the invention, the browser sends the request for the second element in response to a request from an interpreted program, or script, that executes from within the browser at the client device. Thus, no client-side agents or program applets are involved in generating the request for the second element. In this way, it is not necessary to modify the operation of the browser or install applets or special browser plug-in applications to the browser, making the improved independent update operation transparent to the user.

Other features and advantages of the present invention should be apparent and will be better understood by reference to the drawings and the following detailed description, which illustrate, by way of example, the principles of the invention.

DETAILED DESCRIPTION OF THE INVENTION

In accordance with the invention, individual display elements of a Web page may be independently updated without reassembling the entire Web page. In addition, the independent update may be accomplished without a client side agent other than a browser. Page elements that do not include a named source, such as text elements, may nevertheless be received from discrete network locations, and therefore they may be independently received and assembled. Such features are provided without special plug-ins or other modifications to a user's browser, and without changes to a server's operations.

System Configuration

Figure 1:
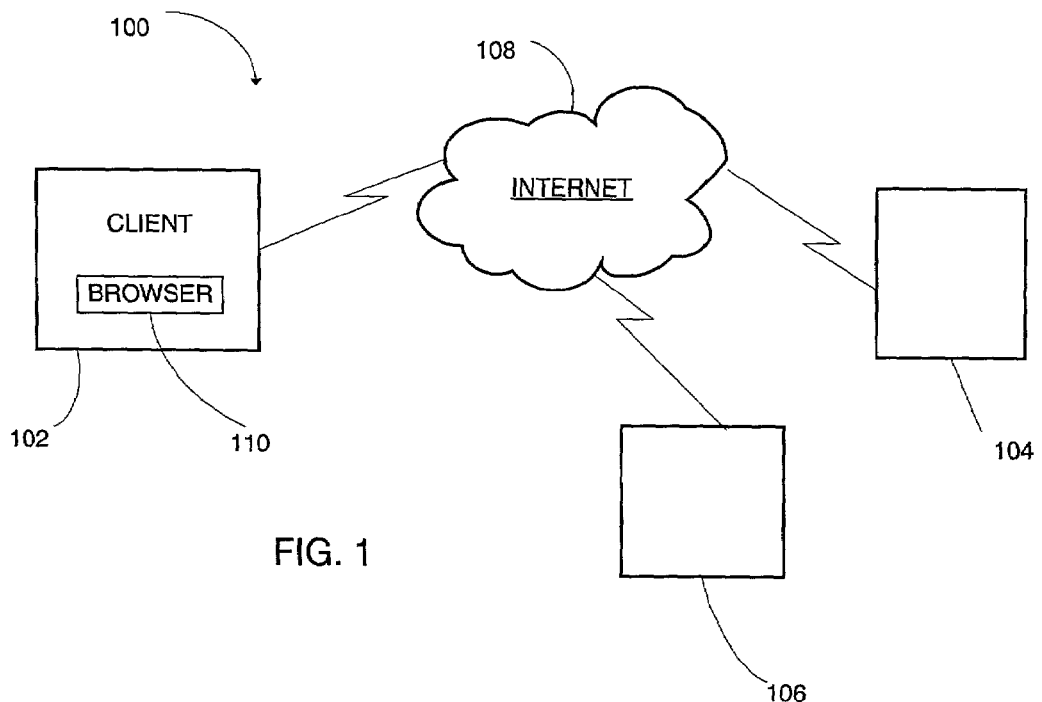
FIG. 1 shows a system having a client and server constructed in accordance with the present invention.

FIG. 1 shows a system 100 having a client 102 and one or more servers 104, 106 constructed in accordance with the present invention. The client and server devices 102, 104, 106 communicate with each other over a shared network 108, such as the Internet. With respect to Internet communications, the user at the client device 102 will receive information for the display of pages from the "World Wide Web" ("the Web") in a graphical user interface viewer program 110, such as a Web browser, that executes at the client machine 102. The browser will automatically display the Web pages at the client device so as to show graphical elements, such as images, show any alphanumeric text, and render multimedia files, such as sound and video information.

Figure 2:
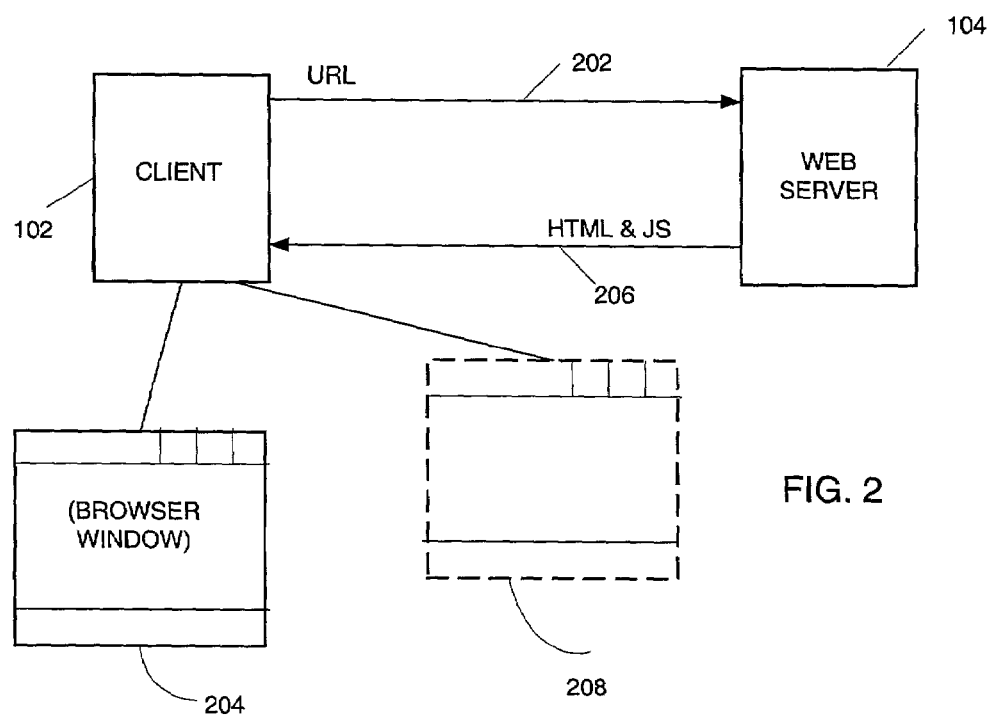
FIG. 2 is a diagrammatic representation of the operations that take place in response to a request for Web page information from the client device illustrated in FIG. 1.

FIG. 2 shows the communications that take place between a user at the client device 102 and the Web server 104. As illustrated in FIG. 2, the client 102 requests a Web page from the Web server 104, as specified by a page request 202 with a URL address. The client sends the request through a window 204 of the browser 110 (FIG. 1) and in response receives HTML code 206 specifying the Web page elements. The HTML code may direct the user's browser to request files from a server, which may be either the same server 104 to which the page request was originally sent, or may be a different server 106 (FIG. 1).

In accordance with the invention, the HTML code 206 returned by the server 104 to the client 102 includes interpreted program code that will cause the browser 110 to request a "phantom" page from a server. The phantom page comprises a page that is associated with a network address (URL) and a second browser window 208, whose contents will not be displayed. The interpreted program code may comprise any suitable program code that is automatically interpreted by the user's browser 110, such as the "JavaScript" (JS) standard established by Sun Microsystems, Inc. The JavaScript code will cause the browser 110 to prepare the second window 208, which is used as a proxy or holder for the phantom page. This second window will be referred to as a proxy window, and is shown in FIG. 2 with dashed lines to indicate it will not be displayed by the browser 110. As described further below, the user's browser 110 will automatically prevent display of the second window, which would otherwise show the phantom page, because a page parameter of the phantom page will be set to indicate "no display". The "no display" condition may be achieved through JavaScript, for example, by setting the page width and page height of the second window to zero.

In accordance with the invention, the proxy window technique can be used to independently update a variety of Web page elements, including text elements. For example, text within cells of a table may be updated with data from a server at regular intervals. In addition, moving a display cursor over a designated text element may cause a pop-up window to appear, or clicking on a hyperlink may cause a different text box to appear. These different responses to triggering events will be described in greater detail below.

In this way, Web pages may be assembled for display, including text elements received from discrete network locations, and individual text elements of a Web page may be independently updated without reassembling the entire Web page. Moreover, all types of page elements may be independently updated without a client side agent other than a browser. Such features are provided without special plug-ins or other modifications to a user's browser, and without changes to a server's operations.

System Devices

Figure 3:
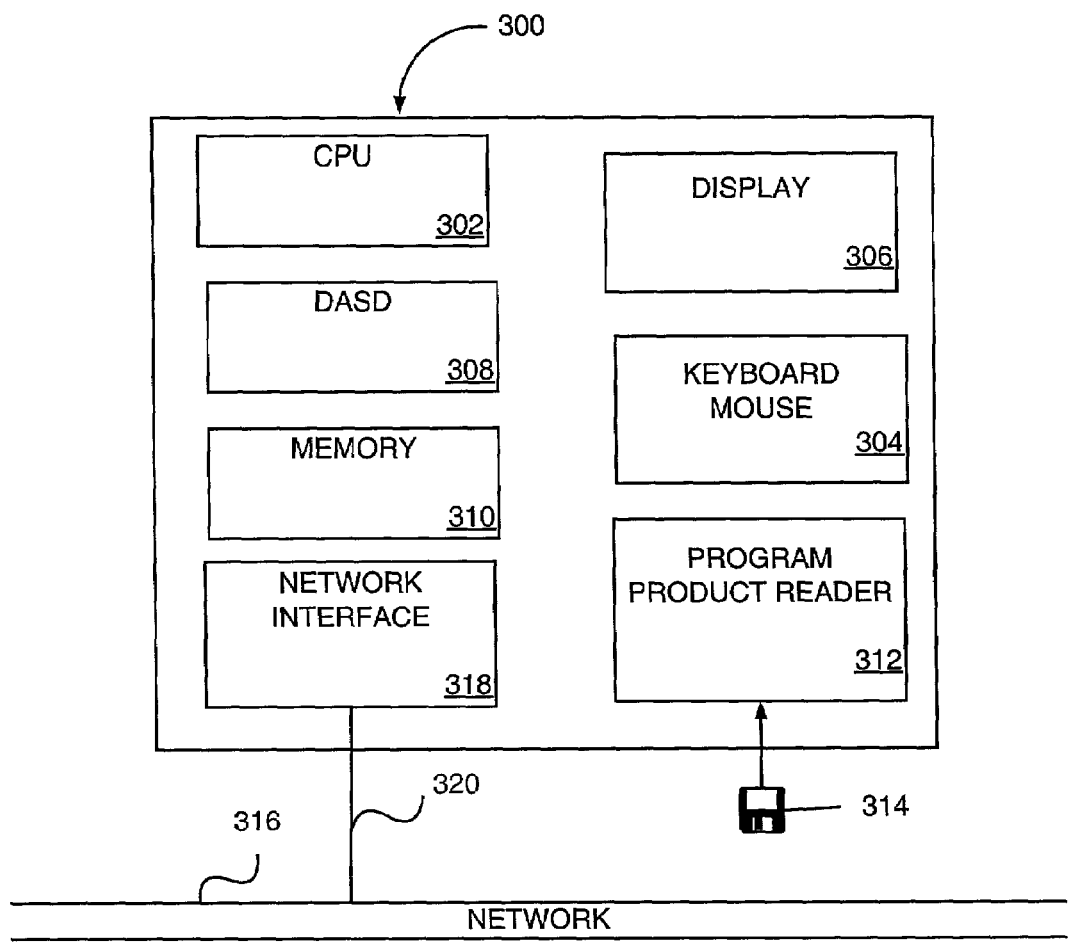
FIG. 3 is a block diagram representation of one of the computers illustrated in FIG. 1.

The computer that implements the client side processing, and the computer that implements the server side processing, or any other computer device of the system, may comprise any conventional computer suitable for implementing the functionality described herein. FIG. 3 is a block diagram of an exemplary computer device 300 such as might comprise any of the computing devices shown in FIG. 1. Each computer operates under control of a central processor unit (CPU) 302, such as an application specific integrated circuit (ASIC) from a number of vendors, or a "Pentium"—class microprocessor and associated integrated circuit chips, available from Intel Corporation of Santa Clara, Calif., USA. Commands and data can be input from a user control panel, remote control device, or a keyboard and mouse combination 304 and inputs and output can be viewed at a display 306. The display is typically a video monitor or flat panel display device.

The computer device 300 may comprise a personal computer or, in the case of a client machine, the computer device may comprise a Web appliance or other suitable Web-enabled device for viewing Web pages. In the case of a personal computer, the device 300 preferably includes a direct access storage device (DASD) 308, such as a fixed hard disk drive (HDD). The memory 310 typically comprises volatile semiconductor random access memory (RAM). If the computer device 300 is a personal computer, it preferably includes a program product reader 312 that accepts a program product storage device 314, from which the program product reader can read data (and to which it can optionally write data). The program product reader can comprise, for example, a disk drive, and the program product storage device can comprise removable storage media such as a floppy disk, an optical CD-ROM disc, a CD-R disc, a CD-RW disc, a DVD disk, or the like. Semiconductor memory devices for data storage and corresponding readers may also be used. The computer device 300 can communicate with the other connected computers over a network 316 (such as the Internet) through a network interface 318 that enables communication over a connection 320 between the network and the computer device.

The CPU 302 operates under control of programming steps that are temporarily stored in the memory 310 of the computer 300. When the programming steps are executed, the pertinent system component performs its functions. Thus, the programming steps implement the functionality of the system illustrated in FIG. 1. The programming steps can be received from the DASD 308, through the program product 314, or through the network connection 320, or can be incorporated into an ASIC as part of the production process for the computer device. If the computer device includes a storage drive 312, then it can receive a program product, read programming steps recorded thereon, and transfer the programming steps into the memory 310 for execution by the CPU 302. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 310 over the network 316. In the network method, the computer receives data including program steps into the memory 310 through the network interface 318 after network communication has been established over the network connection 320 by well-known methods that will be understood by those skilled in the art without further explanation. The program steps are then executed by the CPU 302 to implement the processing of the system.

Page Display

Figure 4:
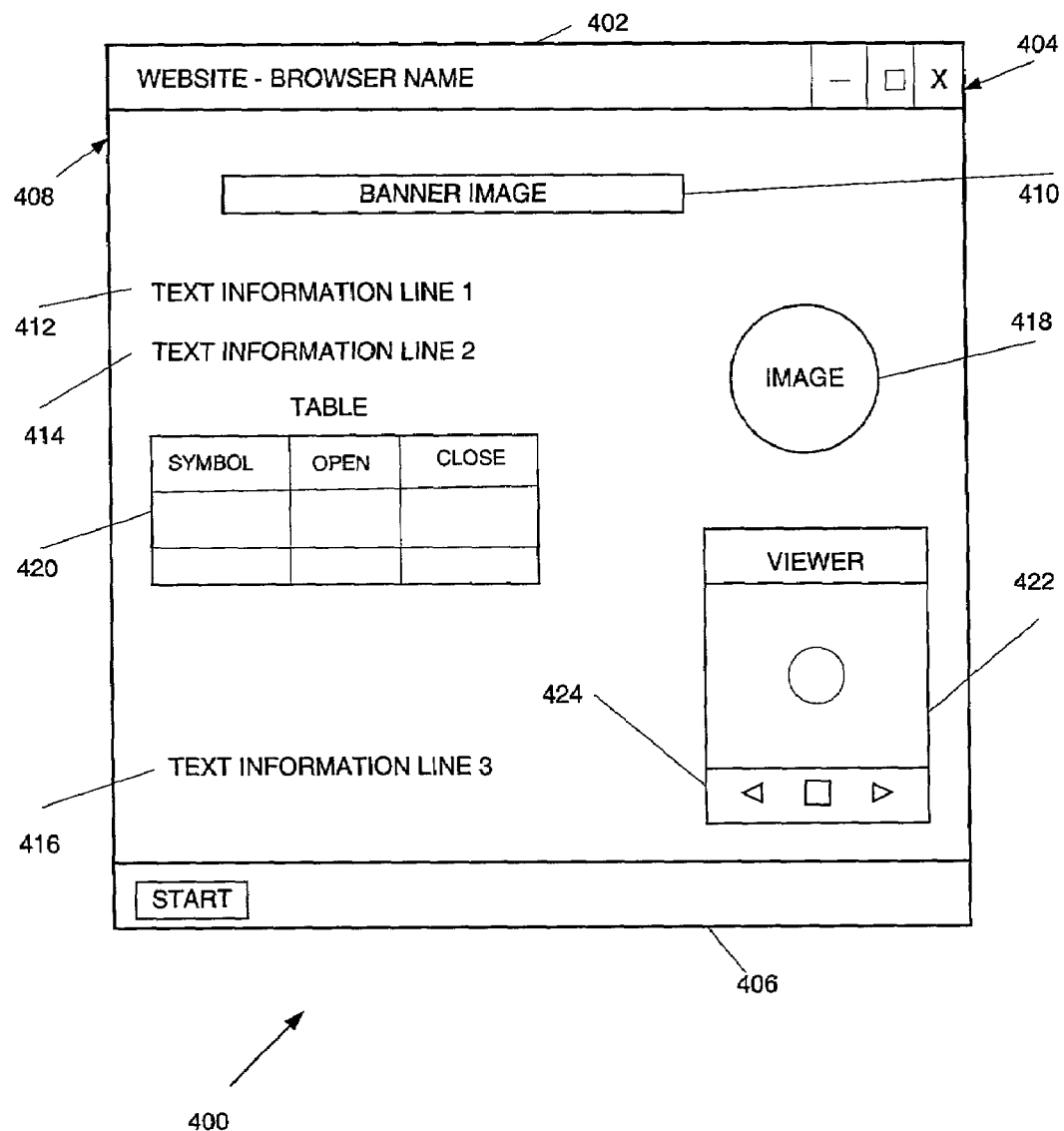
FIG. 4 illustrates a Web page that appears on a display of the client device illustrated in FIG. 1.

FIG. 4 shows a Web page 400 that is displayed at the client device 102 illustrated in FIG. 1. The Web page will appear, for example, on the display 306 of the client device. FIG. 4 shows that the Web page includes typical display artifacts for a computer program that executes in a window operating system (OS) environment, such as that provided by the "Windows 2000" or "Windows NT" OS by Microsoft Corporation or the "MacIntosh" OS by Apple Computer Corporation. Thus, the Web page window display 400 includes a title bar 402 and window sizing icons 404 at the top of the page. The bottom of the page window includes a program tray 406 in which various program icons may be placed.

On the display, within a working space or display area 408 of the page window 400, are the contents, or page elements, of a requested Web page. As illustrated in FIG. 4, these elements may be displayed, or rendered, in a variety of ways. For example, the page 408 may include a banner image 410 that is typically a graphic image, such as represented by a GIF file or JPEG file. The page 400 may also include lines of text information, such as illustrated by "Text Information Line 1" 412, Text Information Line 2" 414, and Text Information Line 3" 416. The page may also include other images 418, typically in a graphical format, such as GIF or JPEG formats. Web pages may also include tables 420 of information, comprising text or other elements arranged in rows and columns. Lastly, Web pages may include multimedia viewers 422, such as for display of streaming video content or audiovisual clips. The viewers may include, for example, the "RealPlayer" viewer from Real Networks, "Quick Time" viewer from Apple Computer, Inc., and "Media Player" from Microsoft Corporation. The viewers generally include on-screen playback controls 424 that permit a user to move forward, reverse, or pause the playback.

Conventionally, only the graphic images 410, 418 and the multimedia content played by the viewer 422 may be independently updated from the remaining elements of the page. This is because such graphic images and multimedia files are identified by image tags of the HTML code. The image tags specify the server (URL) at which the graphic may be found and from which the graphic must be requested. Those skilled in the art will appreciate that a request for a Web page causes a corresponding Web server to generate the HTML code for the Web page, much of which comprises alphanumeric text that a user's browser will then render and display. For graphic and multimedia files, the Web server will deliver alphanumeric HTML text and, where appropriate, will embed URL addresses that specify the network locations at which the graphical images may be found. When the client browser receives the HTML code from the Web server, the browser will automatically render the HTML code to generate the proper text. When the client encounters an embedded HTML code specifying a URL address, the browser will automatically send out another request, this time for the specified URL of the graphical image element. The request will be sent to the server at the URL specified in the address. When the graphical image is returned, the user's browser will automatically render the image and display it with the other elements of the Web page.

Operation

Figure 5:
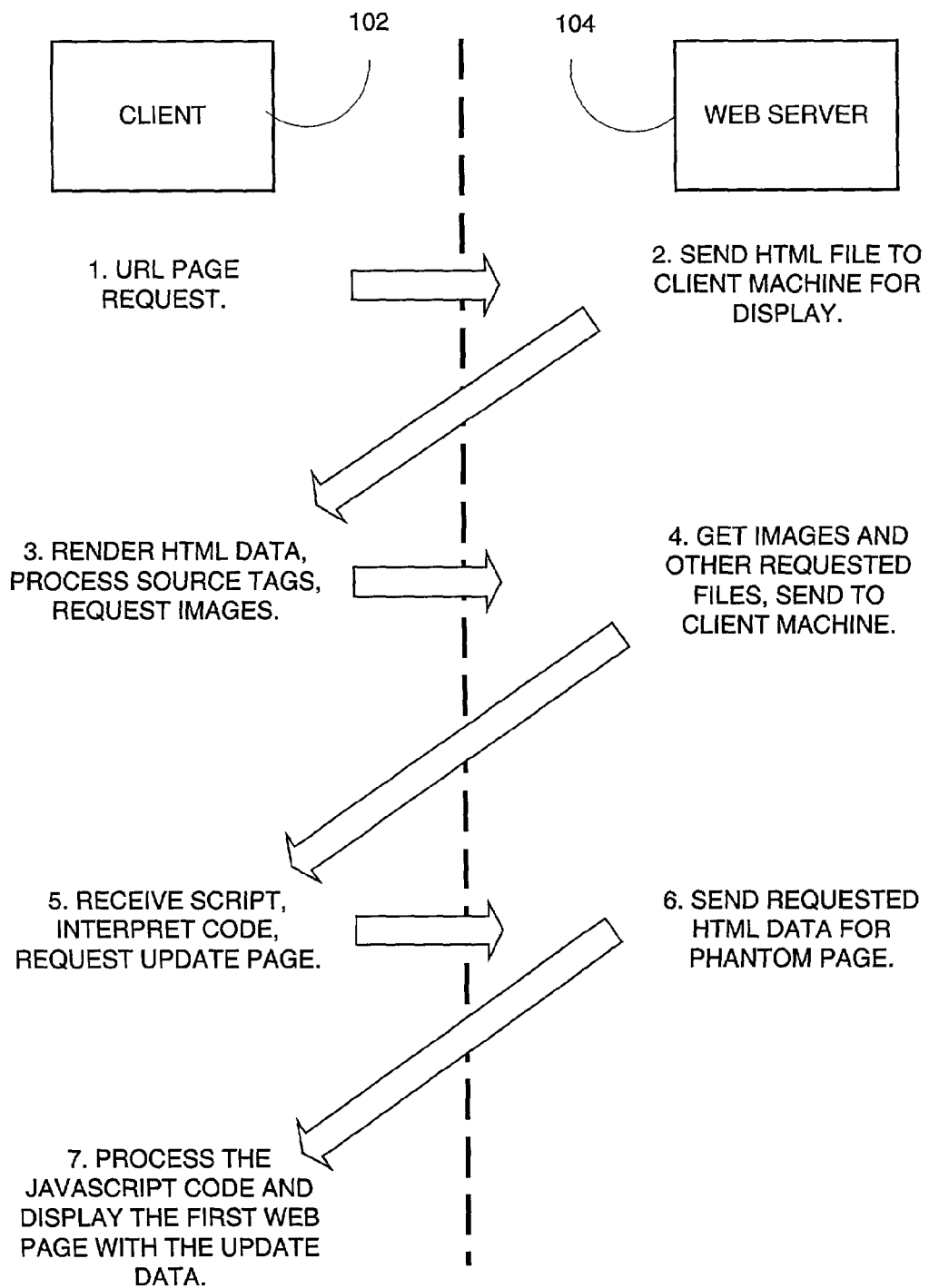
FIG. 5 is a flow diagram that illustrates the processing performed by the client device of FIG. 1 in independently updating a text element of the Web page illustrated in FIG. 4.

FIG. 5 is a diagrammatic representation of the processing performed by the system of FIG. 1 in independently updating and assembling the Web page illustrated in FIG. 4. As indicated in FIG. 5, the processing begins with the client 102 sends a request for a Web page to the server 104. This operation is indicated as "1. URL PAGE REQUEST." In response, the server retrieves or generates the HTML code for the Web page and sends it to the client. This operation is represented by the second FIG. 5 entry, "2. SEND HTML FILE TO CLIENT MACHINE FOR DISPLAY." When the client receives the Web page data, the client's browser interprets the HTML code to display the proper text, and requests the appropriate source files, such as graphic images, sound files, or multimedia presentations. This operation is represented in FIG. 5 by the notation "3. RENDER HTML DATA, PROCESS SOURCE TAGS, REQUEST IMAGES." The various files specified in the HTML code for the page will be the subject of corresponding file requests from the browser. The browser requests are received at the Web server (which may or may not be the same server from which the client first requested the Web page), and the Web server responds by returning the requested files. This operation is represented by the fourth entry, "4. GET IMAGES AND OTHER REQUESTED FILES, SEND TO CLIENT MACHINE."

As noted above, the system of FIG. 1 utilizes a scripting language to cause the client browser to automatically generate requests for update data, with which the browser may update Web page elements that do not otherwise have a named source. These elements to be updated may include text information, such as table contents. Therefore, the request for files in operation (3) includes a request for a scripting file. The scripting language may comprise, for example, the "JavaScript" specification from Sun Microsystems, Inc. The Web server response, in operation (4), will be to generate a JavaScript file that contains script code that will cause the client's browser to generate a request for update data.

Thus, the HTML code that the client receives from the server as a result of operation (2) will include a reference to a JavaScript file at a Web server. This reference is processed as follows. As the client browser renders (displays) the Web page in operation (3), it will parse the received HTML code. Portions of the HTML code will include formatted alphanumeric text, which the browser will display, and will include references to source files, such as images, and also to audio and multimedia files, and the like. In accordance with the invention, the HTML code will also include a reference to a JavaScript file that implements the functionality described herein. When the client's browser parses the received page code and encounters the JavaScript reference in operation (3), the browser will generate a request to the Web server referenced by the JavaScript. The Web server will receive the request and in operation (4) will generate the appropriate JavaScript code and deliver it to the client browser, as will any requested source files such as images, sounds, and the like. Thus, the reference to a JavaScript file is converted into actual JavaScript code that is placed at the appropriate location in the HTML code for the Web page.

When the JavaScript code is received, it will be automatically interpreted by the browser, which will cause the script program to be executed by the browser. In accordance with the invention, the JavaScript code will cause the browser to request another page, for a second Web page. This operation is represented by the fifth entry of FIG. 5, "5. RECEIVE SCRIPT, INTERPRET CODE, REQUEST UPDATE PAGE." The JavaScript code in accordance with the invention specifies that the requested second page will not be displayed by the browser. That is, the data contained in the second (update) page will be received, but no page will be displayed. Thus, the requested page comprises a "phantom" page (hence the dashed line representation of FIG. 2). When the Web server receives the request for the phantom page after operation (5), it will generate the requested data and will send it (otherwise formatted as an HTML page) to the browser. The sending operation is represented in FIG. 5 by the sixth entry, "6. SEND REQUESTED HTML DATA FOR PHANTOM PAGE."

When the client browser receives the requested update data, it processes the data according to the JavaScript code to perform whatever task has been specified by the Web page author or developer for display within the original Web page window, rather than in the phantom second window. For example, the updated data may call for placement in a cell of a table in the original Web page, thereby updating the table values. The updated data may be for placement in a special data window, such as a stock market price ticker or an auction site bid window of the first Web page. In any case, the operation of displaying the updated data in the first Web browser window is represented by the FIG. 5 entry of "7. PROCESS THE JAVASCRIPT CODE AND DISPLAY THE FIRST WEB PAGE WITH THE UPDATE DATA."

Because the JavaScript code as described above can use the browser to request a new page from a Web server, and information from the new page can be extracted by the browser and inserted into the original page, the JavaScript code can be used to independently update Web page elements that previously could not be updated separately from other alphanumeric text elements on the page. For example, a table may be updated using the technique described herein to independently update particular table cells.

The present invention has been described above in terms of presently preferred embodiments so that an understanding of the present invention can be conveyed. There are, however, many configurations for network data delivery not specifically described herein, but with which the present invention is applicable. The present invention should therefore not be seen as limited to the particular embodiments described herein, but rather, it should be understood that the present invention has wide applicability with respect to network data delivery generally. All modifications, variations, or equivalent arrangements and implementations that are within the scope of the attached claims should therefore be considered within the scope of the invention.

We claim:

1. A method for independently updating individual display elements of a displayable Web page on a client device, the method comprising:
    responsive to a first page request originating at a first browser window on the client device and directed to a first Web server at a first network address, receiving from the first Web server Hyper Text Markup Language (HTML) code specifying the individual display elements of the displayable Web page and including at least one script code;
    automatically interpreting the at least one script code in the browser to prepare a proxy window on the client device and transmit a second page request for a second, non-displayable phantom Web page from the proxy window to a second Web server at a second network address;
    displaying in the first browser window of the client device, the displayable Web page assembled from the individual display elements of the displayable Web page downloaded from the first Web server;
    responsive to the second page request for said non-displayable phantom Web page, receiving at the client device, from the second Web server at the second network address, at least one second Web page element that is related to at least one of the individual display elements of the displayable Web page;
    assembling without displaying the non-displayable phantom Web page in the proxy window from the at least one second Web page element; and
    while continuing to display the displayable Web page in the first browser window, updating said at least one of the individual display elements of the displayable Web page using said at least one second Web page element associated with said non-displayable phantom Web page assembled but not displayed in the proxy window.

2. A method as defined in claim 1, wherein the steps of transmitting, receiving, and updating are accomplished without a client device agent other than a Web browser.

3. A method as defined in claim 1, wherein the second Web page element replaces the first Web page element on the displayable Web page.

4. A method as defined in claim 3, wherein transmitting the request for the second Web page element is responsive to a timer event.

5. A method as defined in claim 3, wherein transmitting the request for the second Web page element is responsive to a mouse-over event.

6. A method as defined in claim 3, wherein transmitting the request for the second Web page element is responsive to a mouse click event.

7. A method as defined in claim 1, wherein the second Web page element augments the first Web page element on the displayable Web page.

8. A method as defined in claim 7, wherein transmitting the request for the second Web page element is responsive to a timer event.

9. A method as defined in claim 7, wherein transmitting the request for the second Web page element is responsive to a mouse over event.

10. A method as defined in claim 7, wherein transmitting the request for the second Web page element is responsive to a mouse click event.

11. A method as defined in claim 7, wherein the second Web page element is displayed in a pop-up window in the browser window.

12. A method as defined in claim 7, wherein the second Web page element is produced by a browser window action.

13. A method as defined in claim 7, wherein the second Web page element provides a responsive hyperlink of the browser window.

14. A method as defined in claim 1, wherein the second Web page element is received by the client device from the Web server.

15. A method as defined in claim 1, wherein the second Web page element is received by the client device from a computer other than the Web server.

16. A method as defined in claim 1, wherein the second Web page element comprises a text element to be displayed with the displayable Web page.

17. A method as defined in claim 16, wherein the second Web page element comprises a text element and at least one source element to be displayed with the displayable Web page.

18. A method as defined in claim 17, wherein the source element comprises a sound file.

19. A method as defined in claim 17, wherein the source element comprises an image file.

20. A method as defined in claim 17, wherein the source element comprises a video file.

21. A method as defined in claim 17, wherein the soiree element comprises a streaming multimedia file.

22. A method as defined in claim 1, wherein the second Web page element comprises a source element to be processed by the browser.

23. A method as defined in claim 22, wherein the source element comprises an image file.

24. A method as defined in claim 22, wherein the source element comprises an applet.

25. A method as defined in claim 1, wherein the second Web page element replaces the first Web page element on the displayable Web page.

26. A method of assembling, displaying and updating a Web page at a client device in a Web client-server network, the method comprising the steps of:
- providing a browser application executing on the client device and operative to display at least one first browser window on the client device;
- responsive to a first web-page request to a Web server originating from the first browser window on the client device, downloading HTML code to the client device from the Web sewer wherein the HTML code includes, at least in part, a reference to a JavaScript file at the Web server;
- processing said HTML code using said browser application to cause the browser to request one or more Web page elements associated with a first Web page from the Web sewer;
- parsing said reference to the JavaScript file using the browser application to cause the browser to generate a data-request from a JavaScript-file-referenced web server;
- responsive to the data-request from a JavaScript-file-referenced web server, generating a JavaScript code at the JavaScript-file-referenced web server and delivering it to the browser;
- assembling the one or more Web page elements to generate and visibly display the first Web page in the first browser window as directed by the first Web page instructions;
- responsive to the JavaScript code encountered upon processing said, causing the browser to request a phantom web-page from the Web server for receipt within a second browser window on the client device, said JavaScript code operative to cause the phantom webpage to be non-displayable in said second browser window;
- responsive to the browser requesting said phantom webpage, retrieving a data associated with the non-displayable phantom Web page from the Web server, the data related at least in part to the one or more Web page elements of the first Web page; and
- selectively updating the one or more Web page elements in said first visible web page in the first browser window using said data associated with the non-displayable phantom Web page so as to preclude reassembly of the first visible web page.

27. A method as defined in claim 26, wherein the step of selectively updating the one or more Web page elements in said first web page in the first browser window further comprising updating the displayed Web page without refreshing the entire page.

28. A method as defined in claim 26, wherein said client device is a personal computer.

29. A method as defined in claim 26, wherein said client device is a handheld device.

30. A method as defined in claims 28 or 29, wherein said second Web page element is not a multimedia or image file.

31. A method as defined in claim 30, wherein no browser plug-ins are utilized.

32. A method as defined in claim 31, wherein no Java Applets are utilized.

33. A method as defined in claim 32, wherein transmitting a request for the second element of the Web page occurs after the HTTP connection has terminated.

34. A method as defined in claim 33, wherein the server utilizes non-Microsoft Web server software.

35. The method of claim 26, wherein said first Web page instructions are, at least in part, browser display instructions specifying the format of the first Web page and a location of at least one text element to be displayed on the first Web page.

36. A method as defined in claim 26, wherein the one or more Web page elements associated with the first Web page include at least one text element.

37. A method as defined in claim 36, wherein the text element is received by the client device from the server.

38. A method as defined in claim 36, wherein the text element is received byte client device from a computer other than the server.

39. A method as defined in claim 36, wherein the steps of retrieving and selectively updating the text element are accomplished without a client device agent other than a Web browser.

40. A method as defined in claim 36, wherein the step of retrieving the data associated with the non-displayable phantom Web page from the Web server includes receiving an updated text element of the displayed Web page.

41. A method as defined in claim 26, further comprising receiving an updated source element of the displayed Web page.

42. The method of claim 26, wherein the JavaScript code is placed at an appropriate location in the HTML code for the Web page.

43. The method of claim 42, wherein, the JavaScript code is interpreted by the browser causing the browser to request the phantom web-page from the Web server.

44. The method of claim 43, wherein responsive to the browser requesting said phantom web-page from the Web server, the Web server generates and sends update data to the browser.

45. The method of claim 44, wherein upon receipt of said update data, the browser processes the update data according to the JavaScript code to cause the selective updating of the one or more Web page elements in said first visible web page.

* * * * *